United States Patent [19]

Mitsui

[11] Patent Number: 4,657,041
[45] Date of Patent: Apr. 14, 1987

[54] OIL PRESSURE CONTROL APPARATUS
[75] Inventor: Tsutomu Mitsui, Chiryu, Japan
[73] Assignee: Aisin Seiki Kabushiki Kaisha, Kariya, Japan
[21] Appl. No.: 765,928
[22] Filed: Aug. 15, 1985
[30] Foreign Application Priority Data
  Aug. 31, 1984 [JP] Japan .................................. 59-180738
[51] Int. Cl.⁴ ............................................ G05D 16/20
[52] U.S. Cl. ............................. 137/116.3; 137/625.64; 192/85 R
[58] Field of Search ......................... 137/116.3, 625.64; 251/30.01; 192/85 R

[56] References Cited
U.S. PATENT DOCUMENTS
  2,605,079  7/1952  Miller .............................. 137/625.64
  2,984,251  5/1961  Quinby ............................. 137/116.3
  3,225,619 12/1965  Schaefer ........................ 137/116.3 X
  3,774,641 11/1973  Mindner ......................... 137/625.64

FOREIGN PATENT DOCUMENTS
  1486256  9/1977  United Kingdom ................ 137/529

Primary Examiner—Robert G. Nilson
Attorney, Agent, or Firm—Burns, Doane, Swecker & Mathis

[57] ABSTRACT

The present invention relates to an oil pressure control apparatus which comprises an oil pressure pump, a pressure regulating valve in a first oil line and a drain valve in a second oil line. A supply valve is provided upstream of the drain valve in the second line for minimizing the oil pressure loss as much as possible, and for providing a short response time upon actuation.

10 Claims, 7 Drawing Figures

Fig. 3
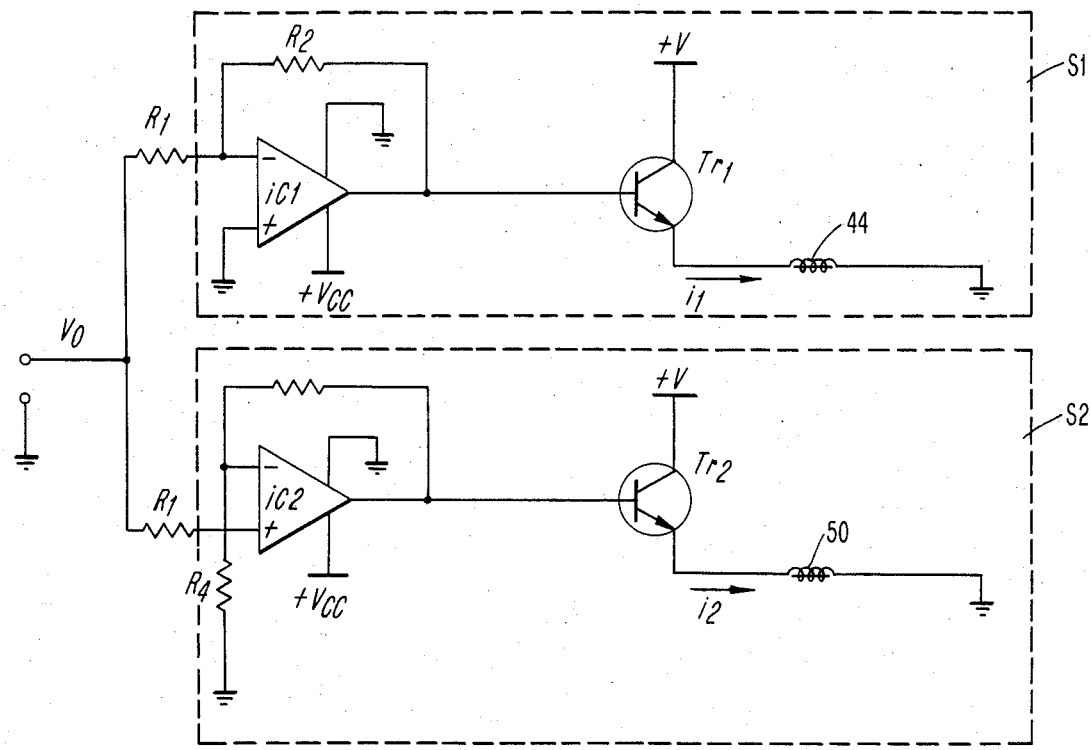
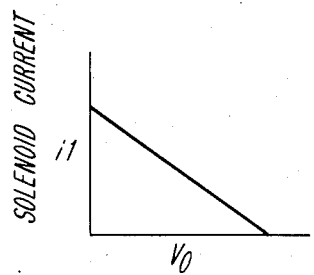
Fig. 4
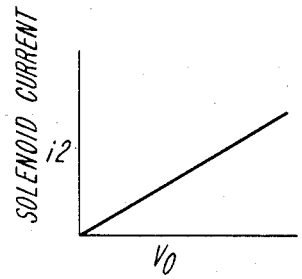
Fig. 5
Fig. 6
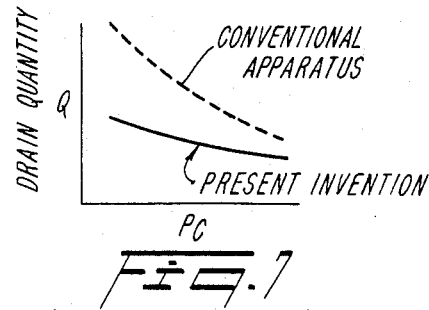
Fig. 7

OIL PRESSURE CONTROL APPARATUS

BACKGROUND OF THE INVENTION

1. Field of the Invention

The present invention relates to an oil pressure control apparatus, and more particularly to an oil pressure control apparatus for controlling a servo mechanism.

2. Description of the Prior Art

A conventional oil pressure control apparatus 10 (FIG. 1) is utilized as one part of an oil pressure apparatus for controlling an oil pressure servo of a clutch portion 11 of vehicles. A mechanical portion of the apparatus includes the clutch portion 11 which is interposed between an engine 12 and a transmission 13 and transmits the power of the engine 12 to the transmission 13. The clutch portion 11 is of the type connected or disconnected (i.e., in torque transmitting or non-torque transmitting modes) by the application of oil pressure to the oil pressure servo (not shown) of the clutch portion 11.

An oil pressure apparatus portion of the oil pressure control apparatus 10 includes an oil pressure pump 14, a pressure regulating valve 15 and a drain valve 16. The pressure regulating valve 15 operates so as to apply the pressure change in a back pressure chamber 17 on a spool 18 via pressure regulating means 19. The valve 15 also regulates the oil pressure of the inlet port 20 at the spool 18 and delivers the regulated oil pressure to an outlet port 21 for delivery through an outlet line 26 to the clutch portion 11. The surplus pressurized oil is discharged through a drain port 22. The drain valve 16 is of a type in which a valve 23 is opened or closed by actuation of an electromagnetic coil 24.

The oil pressurized in the oil pressure pump 14 is supplied to the inlet port 20 of the pressure regulating valve 15 through a supply line 25. The pressurized oil whose pressure is regulated by the pressure regulating valve 15 is supplied to the oil pressure servo of the clutch portion 11 through the outlet line 26.

The pressurized oil for controlling the outlet pressure of the pressure regulating valve 15 is supplied to the back pressure chamber 17 of the pressure regulating valve 15 through a control line 27 branched from the supply line 25. A restricted orifice 28 is disposed in the control line 27 at the upstream side of the back pressure chamber 17 for limiting the supply of the pressurized oil to the chamber 17. The drain valve 16 is located at the downstream side of the back pressure chamber 17.

The operation according to the oil pressure control apparatus 10 of FIG. 1 is as follows:

When the current flows to the electromagnetic coil 24 of the drain valve 16, the valve 23 is opened and the pressurized oil within the control line 27 is discharged. The quantity of the oil supplied to the back pressure chamber 17 of the pressure regulating valve 15 is limited by the orifice 28, so that the pressure in the back pressure chamber 17 is decreased. The decreased pressure causes movement (rightward in FIG. 1) of the spool 18 such that the drain port 22 is opened and at the same time the opening of the inlet port 20 is limited. The pressurized oil at the outlet port 21 is discharged from the drain port 22 and hence the pressure on the oil pressure servo of the clutch portion 11 is decreased. When the spool 18 is completely moved rightwardly, the inlet port 20 is fully closed and the pressure on the oil pressure servo becomes zero and the clutch is disconnected.

Conversely, when the current flowing to the electromagnetic coil 24 is blocked, the valve 23 of the drain valve 16 is closed and the pressure in the back pressure chamber 17 of the pressure regulating valve 15 is increased and the spool 18 is moved in an opposite direction (i.e., to the left in FIG. 1). Accordingly, the spool 18 enlarges the opening of the inlet port 20 and simultaneously increases the oil pressure at the outlet port 21 by limiting the opening of the drain port 22, so that the pressure on the oil pressure servo of the clutch portion 11 is increased and the clutch is connected. The current flowing to the electromagnetic coil 24 is normally linearly changed.

The orifice 28 disposed within the control line 27 limits the quantity of the oil flowing to the back pressure chamber 17 and the back pressure is regulated by the drain valve 16 in the conventional oil pressure control apparatus. However, in the construction according to the conventional apparatus, when the valve 23 of the drain valve 16 is opened, the pressurized oil of the supplying line 25 is endlessly discharged via the orifice 28. Accordingly, the pressure loss becomes very large. An oil pressure pump having a large capacity is conventionally used for the oil pressure circuit in order to minimize the pressure loss. However, the use of such a large capacity pump is naturally uneconomical. As an alternative, the diameter of the orifice 28 may be decreased. In this case when the control signal for increasing the back pressure in the chamber 17 is sensed and the electromagnetic coil 24 is activated to close the valve 27, the response time is too long.

SUMMARY OF THE PRESENT INVENTION

An object of the present invention is to provide an improved oil pressure control apparatus which obviates the aforementioned drawbacks of the conventional oil pressure control apparatus.

A further object of the present invention is to provide an improved oil pressure control apparatus which minimizes the oil pressure loss as much as possible.

A still further object of this invention is to provide an improved oil pressure control apparatus which has a short response time upon actuation.

According to the present invention, an oil pressure control apparatus which is provided with a drain valve in a control line communicated with a back pressure chamber of a pressure regulating valve includes a supply valve provided at the upstream side of the drain valve. The drain valve and the supply valve are simultaneously controlled. When the signal for opening is transmitted to the drain valve, the signal for closing is simultaneously transmitted to the supply valve. In this case, a quantity of the oil of the control line is retained by the supply valve and the oil downstream therefrom is discharged through the drain valve. The oil pressure of the back pressure chamber of the pressure regulating valve is decreased by the oil discharged through the drain valve and the influence of the regulating means for regulating a spool of the regulating valve becomes weak. The quantity of oil to be discharged is limited by the supply valve, so that only a relatively small quantity of oil is required to be discharged.

When the signal for closing is transmitted to the drain valve, a signal for opening is simultaneously transmitted to the supply valve. Consequently, the quantity of the oil flowing within the control line is increased. Due to the pressure existing upstream of the supply valve, the oil pressure of the back pressure chamber is also increased in a short amount of time after transmission of the signal. As a result, the regulating means for regulating the spool becomes strong and the pressure at the outlet port of the regulating valve is increased.

BRIEF DESCRIPTION OF THE DRAWINGS

Various other features, objects and attendant advantages of the present invention will become self-evident when considered in connection with the accompanying drawings wherein:

FIG. 3 is a schematic view of a control circuit of a drain valve and a supply valve in FIG. 2;

FIG. 4 is a graph of an output of the S1 circuit in FIG. 3;

FIG. 5 is a graph, similar to FIG. 4, of an output of the S2 circuit in FIG. 3;

FIG. 6 is a graph of an output of the oil pressure control apparatus of FIG. 2; and FIG. 7 is a graph of a characteristic according to the present invention.

DETAILED DESCRIPTION OF THE PREFERRED EMBODIMENT

Figure 1:
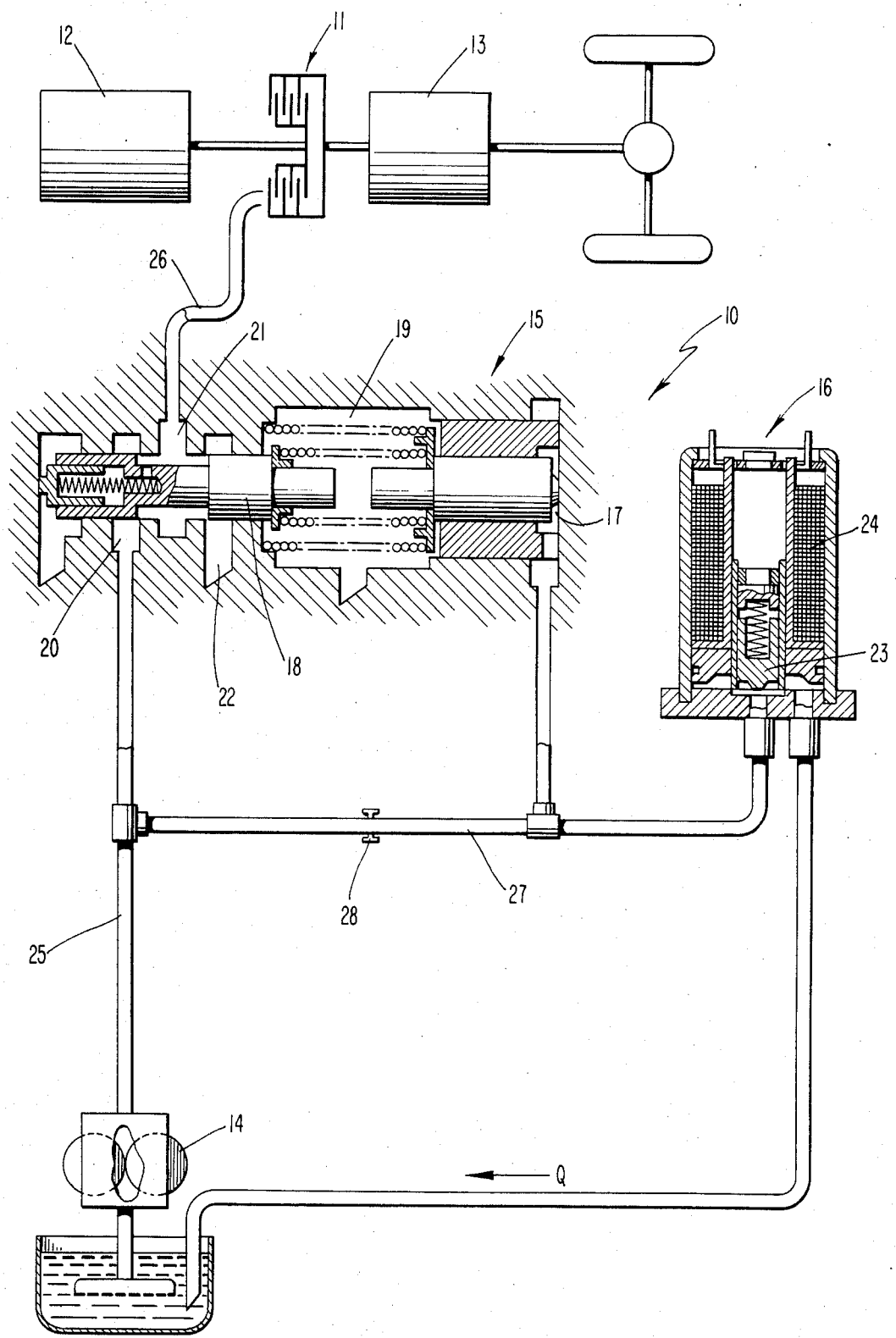
FIG. 1 is a schematic view of a conventional oil pressure control apparatus.
Figure 2:
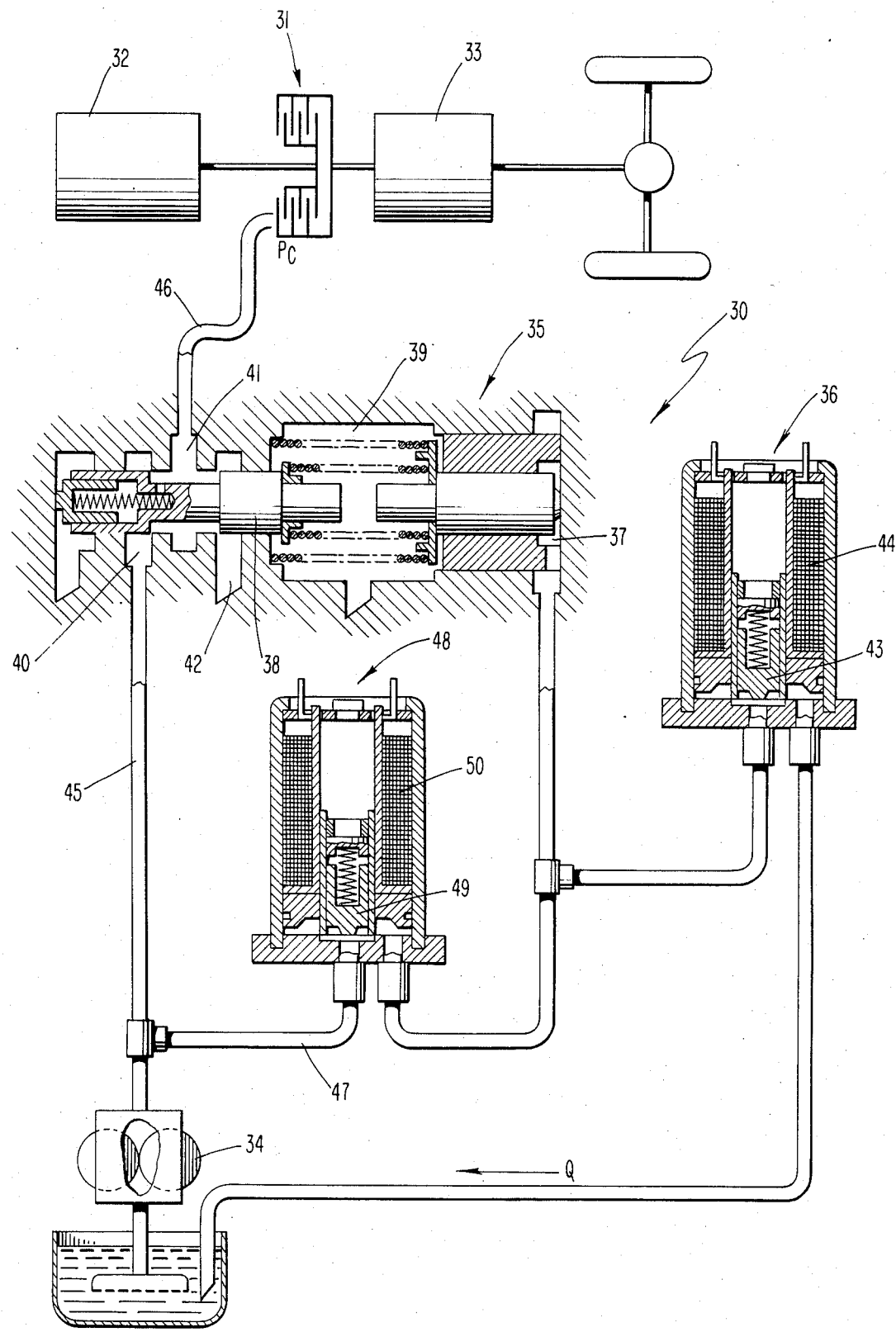
FIG. 2 is a schematic view, similar to FIG. 1, of a preferred embodiment of an oil pressure control apparatus according to the present invention.

With reference to FIG. 2, an oil pressure control apparatus 30 is utilized as one portion of an oil pressure apparatus for controlling an oil pressure servo (not shown) of a clutch portion 31 of vehicles. A mechanical portion of the apparatus includes the clutch portion 31 which is interposed between an engine 32 and a transmission 33 and transmits the power of the engine 32 to the transmission 33. The clutch portion 31 is of the type connected or disconnected (i.e., in torque transmitting or non-torque transmitting modes) by the application of oil pressure to the oil pressure servo of the clutch portion 11.

An oil pressure apparatus portion of the oil pressure control apparatus 30 includes an oil pressure pump 34, a pressure regulating valve 35 and a drain valve 36. The pressure regulating valve 35 operates so as to apply the pressure change of a back pressure chamber 37 on a spool 38 via pressure regulating means 39. The valve 35 also regulates the oil pressure of the inlet port 40 at the spool 38 and deliver the regulated oil pressure to the outlet port 41 for delivery through an outlet line 46 to the clutch portion 31. The surplus pressurized oil is discharged through a drain port 42. The drain valve 36 is of a type in which a valve 43 is opened or closed by actuation of an electromagnetic coil 44.

The oil pressurized in the oil pressure pump 34 is supplied to the inlet port 40 of the pressure regulating valve 35 through a supply line 45. The pressurized oil whose pressure is regulated by the pressure regulating valve 35 is supplied to the oil pressure servo of the clutch portion 31 through the outlet line 46.

The oil pressure control apparatus 30 also includes a supply valve 48 disposed within a control line 47 which is located at the upstream side of back pressure chamber 37 and the drain valve 36. The supply valve 48 has a construction which is generally similar to that of the drain valve 36. The supply valve 48 includes an electromagnetic coil 50 that opens and closes a valve 49. Both the drain and supply valves 36, 48 are controlled by the suitable electrical circuit. With reference to the preferred embodiment (FIG. 3), the drain valve 36 is controlled by a circuit S1 and the supply valve 48 is controlled by a circuit S2.

The circuit S1 includes an inverting amplifier circuit and a NPN transistor Tr1. An output terminal of an operational amplifier ic1 of the inverting amplifier circuit is connected to an inverting input terminal through a resistance R2 and the inverting input terminal is connected to a terminal of a control signal through a resistance R1. A non-inverting input terminal of the amplifier ic1 is grounded. Only the positive voltage, +V, is added to the operational amplifier ic1.

The output terminal of the operational amplifier ic1 is connected to a base of the NPN transistor Tr1, the voltage +V is connected to a collector, and the electromagnetic coil 44 of the drain valve 36 is connected to an emitter, respectively.

The circuit S2 includes a non-inverting amplifier circuit and a NPN transistor Tr2. An output terminal of an operational amplifier ic2 of the non-inverting amplifier circuit is connected to an inverting input terminal through a resistance R3 and is grounded via a resistance R4. A non-inverting input terminal is connected to a terminal of the control signal through the resistance R1. The positive voltage, +V, is added to the operational amplifier ic2.

The output terminal of the operational amplifier ic2 is connected to a base of the NPN transistor Tr2, the voltage +V is connected to a collector, and the electromagnetic coil 50 of the supply valve 48 is connected to an emitter, respectively.

The circuit S1 generates an output solenoid current i1 decreased according to the increase of the signal Vo to the electromagnetic coil 44 of the drain valve 36 (FIG. 4) when the control signal Vo is established. Both currents, S1 and S2, are preferably varied linearly and hence the valves can be progressively opened and closed for maximum control of the oil flow in the control line 47.

The circuit S2 generates an output solenoid current i2 increased in proportion to the signal Vo to the electromagnetic coil 50 of the supply valve 48 (FIG. 5) when the pressure control signal Vo is established. Accordingly, when the Vo signal for initiating the opening of the drain valve 36 is established, the solenoid signal i2 for initiating the closing of the valve 49 is transmitted to the supply valve 48. The pressure of the back pressure chamber 37 of the pressure regulating valve 35 is decreased and the quantity of the drain discharged from the drain valve 36 is increased. When the signal Vo for initiating the closing of the drain valve 36 is transmitted, the solenoid signal i2 for initiating the opening of the valve 49 is transmitted to the supply valve 48 and the pressure in the back pressure chamber 37 is increased according to the signal Vo. In other words, the drain valve 36 and the supply valve 48 have simultaneous inverse operation. With reference to FIG. 6, the clutch pressure Pc increases in proportion to the pressure control signal Vo and is transmitted from the outlet port 41 of the pressure regulating valve 35 through the outlet line 46.

The characteristics of the clutch pressure Pc relative to drain quantity Q according to the present invention is shown in FIG. 7. The solid line indicates the present invention and the dotted line indicates the conventional control apparatus. According to the graph of FIG. 7, it can be easily understood that the drain quantity Q of the present invention is less than that of the conventional approach, for generating the same clutch pressure Pc.

In this embodiment the application of the present invention is for the clutch servo. However, the present invention is also applicable for the servo of CVT.

The pressure regulating valve 35, the drain valve 36 and the supply valve 48 may be changed during system design in accordance with the control objects. Moreover, the present invention can be utilized with all oil pressure control circuits generally utilizing this kind of pressure regulating valve.

According to the present invention, when the pressure of the back pressure chamber 37 of the pressure regulating valve 35 is decreased, the supply valve 48 limits the quantity of oil delivered through the control line 47. Consequently, the drain quantity discharged from the drain valve 36 is decreased and also the energy loss can be substantially eliminated. Consequently, the oil pressure pump 34 can be substantially smaller in pumping capacity. The oil quantity of the control line 47 can be limited to less than the oil quantity discharged through the fixed orifice of the prior art by use of the supply valve 48 of the present invention. This reduction also eliminates or reduces the vibration generated upon opening the drain valve 36. When the pressure of the back pressure chamber 37 is increased, the opening of the supply valve 48 is increased, so that the response becomes quicker.

The principles, preferred embodiment and mode of operation of the present invention have been described in the foregoing specification. However, the invention which is intended to be protected is not to be construed as limited to the particular embodiment disclosed. The embodiment is to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A clutch control apparatus comprising:
a clutch portion;
an oil pressure pump;
first passage means for communicating said oil pressure pump with said clutch portion;
pressure regulating valve means for controlling oil pressure in said first passage means, said pressure regulating valve means having a back pressure chamber;
second passage means for communicating said back pressure chamber with said oil pressure pump;
drain valve means for selectively draining said chamber, said drain valve means in communication with said second passage means;
supply valve means for controlling a pressure of said back pressure chamber, said supply valve means at a location along said second passage means; and
control means for inversely operating said drain valve means and supply valve means during all operating conditions of said clutch control apparatus.

2. The oil pressure control apparatus as set forth in claim 1, wherein said supply valve means includes a valve member and an electromagnetic coil for operating said valve member.

3. The oil pressure control apparatus as set forth in claim 2, wherein said drain valve means is controlled by first circuit means having inverting amplifier means and first transistor means, and
said supply valve means being controlled by second circuit means having non-inverting amplifier means and second transistor means.

4. The oil pressure control apparatus as set forth in claim 3, wherein at least one of said first and second transistor means is an NPN transistor.

5. The oil pressure control apparatus as set forth in claim 3, wherein said second circuit means supplies a solenoid current to said electromagnetic coil member of said supply valve means, said current being varied in proportion to variations in a control signal so that said supply valve means may be operated progressively.

6. The oil pressure control apparatus as set forth in claim 5, wherein said first circuit means supplies a solenoid current to an electromagnetic coil of said drain valve means, said current being varied in proportion to variations in a control signal so that said drain valve means may be operated progressively.

7. The oil pressure control apparatus as set forth in claim 3, wherein said first and second circuit means simultaneously generate a current upon receipt of a control signal.

8. The oil pressure control apparatus as set forth in claim 1, wherein said second passage means includes a first oil line extending from said pressure pump to said supply valve means and a second oil line extending from said supply valve means to said back pressure chamber, said first and second oil lines being unrestricted by throttling constrictions.

9. A clutch control apparatus comprising:
a clutch portion operable by oil pressure;
an oil pressure pump;
first passage means for communicating said oil pressure pump with the clutch portion;
pressure regulating valve means for controlling oil pressure in said first passage means, said pressure regulating means having a back pressure chamber;
second passage means for communicating said back pressure chamber with said oil pressure pump;
progressively operable, drain valve means for selectively draining said back pressure chamber;
progressively operable, supply valve means for controlling pressure of said back pressure chamber, said supply valve means at a location along said second passage means; and
control means for inversely operating said drain valve means and said supply valve means during all operating conditions of said clutch control apparatus;
whereby the quantity of oil drained from said back pressure chamber is reduced.

10. The clutch control apparatus as set forth in claim 9, wherein said second passage means includes a first oil line extending from said pressure pump to said supply valve means and a second oil line extending from said supply valve means to said back pressure chamber, said first and second oil lines being unrestricted by throttling constrictions.

* * * * *